No. 710,988. Patented Oct. 14, 1902.
H. MUIR.
FRICTION CLUTCH.
(Application filed Mar. 19, 1902.)
(No Model.) 2 Sheets—Sheet 1.
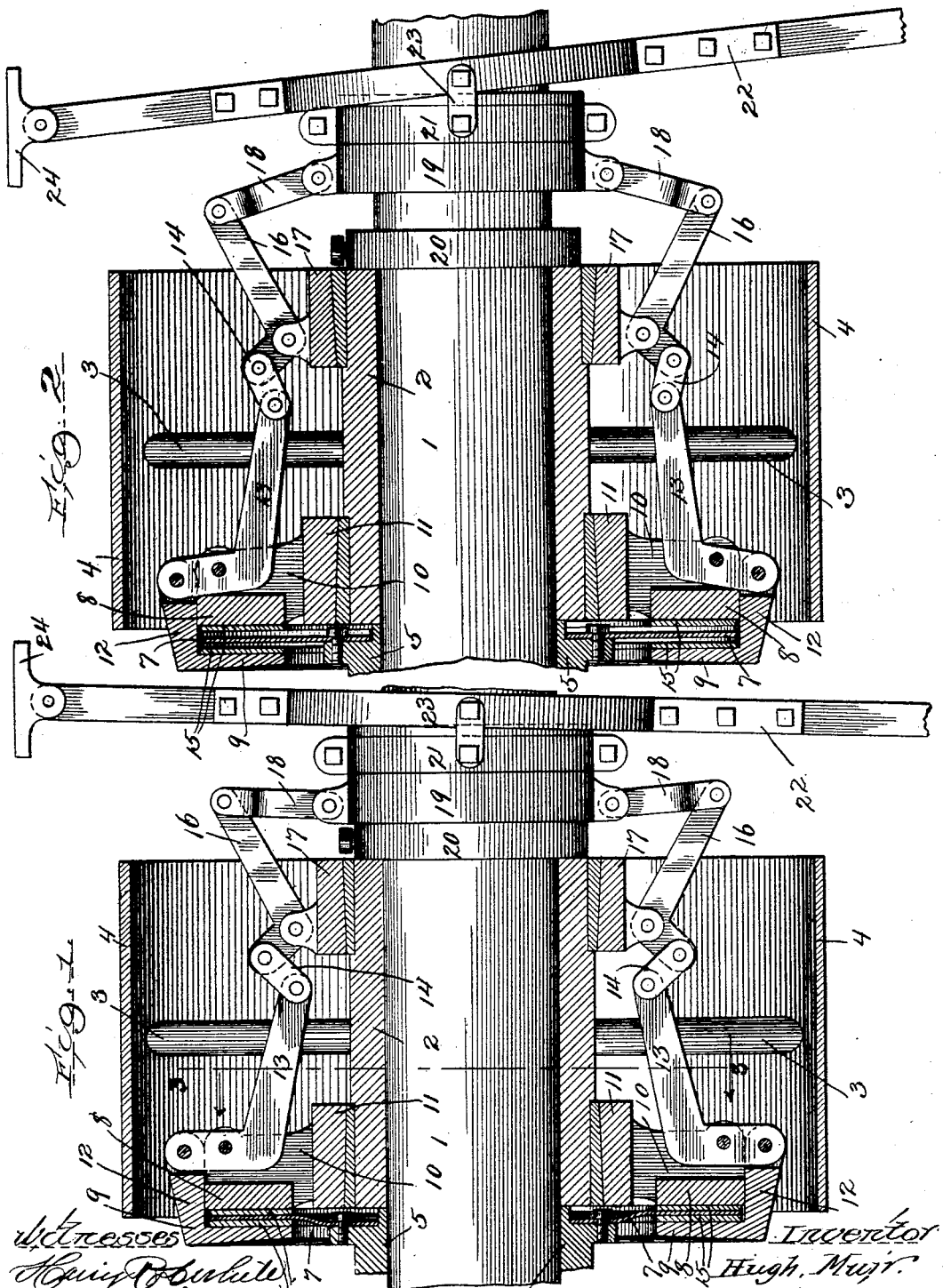

No. 710,988. Patented Oct. 14, 1902.
H. MUIR.
FRICTION CLUTCH.
(Application filed Mar. 19, 1902.)
(No Model.) 2 Sheets—Sheet 2.

Witnesses
Charles W. Herrick
Sadie Wolf

Inventor
Hugh Muir
By Jesse & H. M. Cox
Attys.

UNITED STATES PATENT OFFICE.

HUGH MUIR, OF CHICAGO, ILLINOIS.

FRICTION-CLUTCH.

SPECIFICATION forming part of Letters Patent No. 710,988, dated October 14, 1902.

Application filed March 19, 1902. Serial No. 98,905. (No model.)

*To all whom it may concern:*

Be it known that I, HUGH MUIR, a citizen of the United States, residing in the city of Chicago, county of Cook, and State of Illinois, have invented a new and useful Improvement in Friction-Clutches, set forth in the annexed specification.

My invention relates to friction-clutches whereby the motion of a revolving shaft may be transmitted to a pulley or to a second shaft, and is of a type in which the levers and movable parts of the clutch mechanism remain stationary when the clutch is released.

The power which a clutch is capable of transmitting is dependent for one factor upon the pressure with which the frictional surfaces are held in contact, and high pressure requires long clutch-levers.

It is the object of my invention to provide means for attaining a powerful leverage without increasing the diameter of the clutch and practically without restricting the diameter of the shaft to which the clutch is applied; or, differently stated, it is my object to enable a clutch of given diameter to receive a shaft of greater diameter than heretofore possible in this type of clutch without sacrificing its power-transmitting qualities.

Another object of my invention is to so construct the parts that they may lie as much as possible within the pulley to thereby reduce to a minimum the length of shaft occupied by the pulley and clutch.

I attain these objects by the mechanism illustrated in the accompanying drawings, in which—

Figure 3:
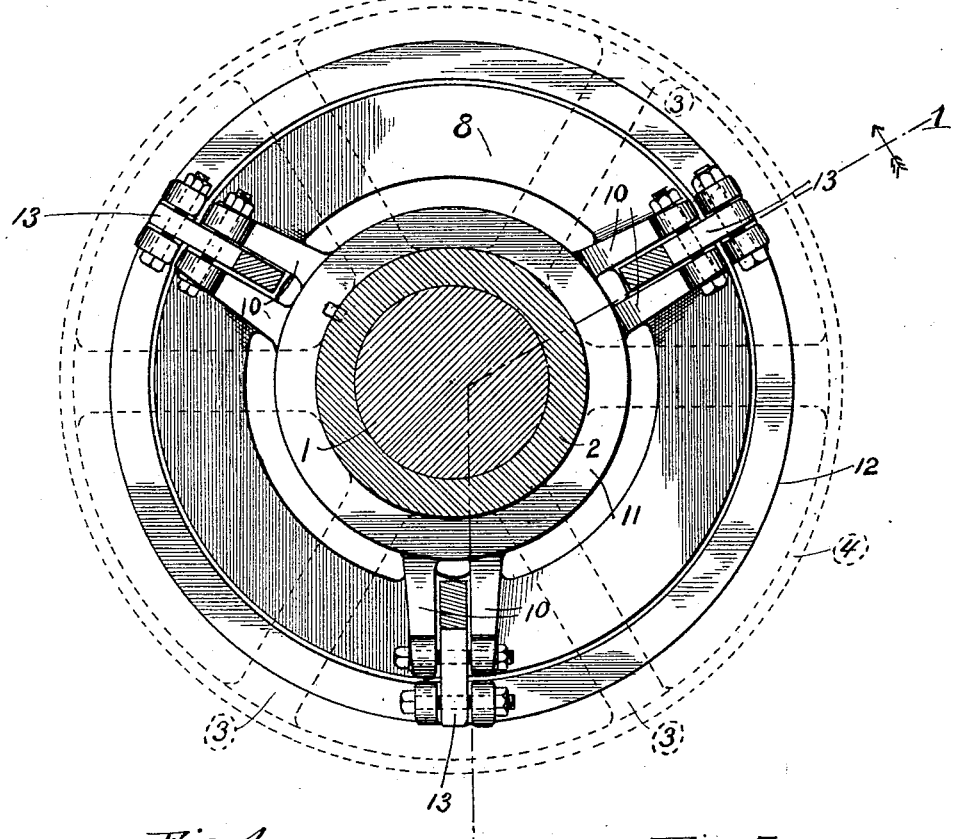
Figure 4:
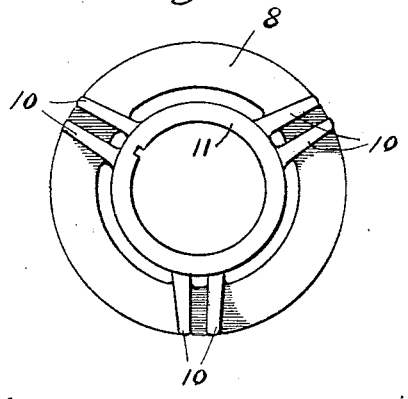
Figure 5:
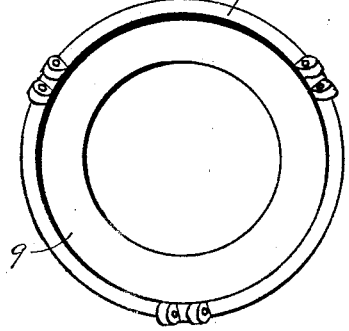

Figures 1 and 2 are views in section on the line 1 1, Fig. 3, showing a pulley-clutch embodying my invention. Fig. 1 shows the clutch set, and Fig. 2 shows the clutch in a released position. Fig. 3 is a vertical section taken on the line 3 3, Fig. 1, showing the arms of the fixed friction-ring and connected parts. Fig. 4 is a view showing the back of the fixed friction-ring. Fig. 5 is a view of the inner face of the movable friction-ring.

Similar numerals refer to similar parts throughout the several views.

1 represents the revolving shaft; 2, the hub of the pulley, which is loose upon said shaft. 3 represents the pulley-arms, and 4 the rim. The collar 5 is secured to the shaft at one end of the hub of the pulley by means of a set-screw or in any other suitable manner. Said collar serves to retain the pulley in place upon the shaft and also affords means of attachment for the circular disk or plate 7. Said plate consists, preferably, of steel and is bolted or otherwise fastened to said collar, so as to revolve at all times with the shaft 1.

The fixed friction-ring 8 and movable friction-ring 9 are located so as to engage the plate 7 at the periphery thereof. Said fixed ring 8 is carried by the arms 10, radiating from the hub 11. Said hub encircles the hub 2 of the pulley and is keyed or otherwise rigidly secured thereto.

The movable friction-ring 9 is adapted to contact the outer face of the plate 7 and has a portion 12, which extends inwardly over ring 8, so as to be guided thereby. Said portion 12 also affords means for pivotal attachment to the lever 13, by which said movable ring is operated. Said lever 13 is approximately L-shaped, having its longest arm extending inwardly toward the farther edge of the pulley. Said lever has a fulcrum on the arm 10 of the hub or ring 11 and is pivotally connected at its inner extremity to the link 14.

The faces of the rings 8 and 9 which are adjacent to the plate 7 are preferably provided with paper frictions 15, and the relation of the parts is such that when the levers 13 are rotated about their fulcrums in the arm 10 the ring 9 is moved toward and from the plate 7.

In order that the plate 7 may be free from the fixed ring 8 when the movable ring is retracted, it is desirable that the plate 7 may be offset a slight distance from said fixed ring. By this construction the forcing of the movable ring inwardly causes the plate 7 to bend and lie in contact with the paper friction on the ring 8, where it is firmly held by said movable ring 9. This action is shown in Fig. 1 of the drawings, in which the resulting bend in the plate 7 is exaggerated for purpose of illustration.

Each link 14 is pivoted at one end to its lever 13, as above mentioned, and is pivoted at the other end to one of the levers 16. Said lever 16 is fulcrumed upon the hub or ring 17, which encircles the pulley-hub 2. Said hub or ring 17 is keyed or otherwise fastened to said pulley-hub. The shortest arm of the lever 16 lies between its fulcrum and the link 14, while the longer arm of each of said levers is pivotally connected to a link 18. The shifting collar 19 is loosely mounted on the shaft 1 and has pivotal connections with each of said links 18. The sliding of said collar along said shaft 1 causes the rotation of the levers 16 about their fulcrums, the motion of said levers being transmitted to the levers 13 by the links 14, and thereby controlling the movable ring 9.

The collar 20 is secured to the shaft 1 by means of set-screws or otherwise and is located at the end of the pulley-hub opposite to the collar 5, thereby preventing the lateral movement of the pulley on the shaft.

The shifting collar 19 is grooved to receive the clip 21 in such a manner that the lateral shifting of said clip causes a corresponding shift of the collar 19; but said collar 19 is free to rotate independently of said clip. By preference said clip is formed in two parts bolted together in place.

The clip 21 is connected to the shifting lever 22 by means of the links 23. The fixed bracket 24 forms a fulcrum for said shifting lever 22, so that the movement of the free end of said lever causes the shifting of the collar 19.

In operation the plate 7 revolves at all times with the shaft 1. When the collar 19 is thrown outward, as shown in Fig. 2, the levers 16 and 13 are swung to such a position that the movable ring 9 is backed off from the plate 7, so that neither the fixed nor the movable rings are in contact therewith. Consequently the motion of the plate is not transmitted to the clutch, and the entire clutch mechanism and the pulley remain still. When the lever 22 is thrown in toward the pulley, the levers 13 and 16 are swung to such a position that the movable ring 9 is drawn toward the fixed ring 8 and the plate 7 is firmly engaged between them. Thus the rotation of the plate 7 is transmitted to the clutch mechanism and the pulley is caused to revolve.

It is evident that in my form of clutch the levers lie in the general direction of the shaft, and therefore the leverage is not affected by the diameter of the shaft or pulley-hub. Moreover, as the major portion of the mechanism lies within the pulley there is an economy in the space required along the shaft. This is frequently of great importance when a number of pulleys are to be mounted closely together upon the same shaft.

Although I have shown the parts 8 and 9 to be continuous rings, it is evident that the continuity is not essential, and a series of jaws, one at each of the radiating arms 10, would be substantially the equivalent of the aforesaid rings.

What I claim as new, and desire to secure by Letters Patent, is—

1. In a friction-clutch the combination of a shaft, a flexible plate rigidly fixed thereto, a laterally-fixed pulley loosely mounted on said shaft, a hub on said pulley, a fixed friction-ring rigidly carried by said hub, a laterally-movable friction-ring, and levers for operating said movable ring to force said flexible plate into frictional contact with said fixed ring.

2. In a friction-clutch, the combination of a shaft, a flexible plate rigidly fixed thereto, a laterally-fixed hub loosely mounted on said shaft, a fixed friction-ring rigidly carried by said hub, a laterally-movable friction-ring for forcing said flexible plate into frictional contact with said fixed ring; an eccentric lever fulcrumed on said hub near one end thereof and connected to said movable ring for operating the same, a second eccentric lever fulcrumed on said hub near the other end thereof, a link connection between said levers, and means on said shaft located at the end of the hub opposite to said flexible plate for operating said levers, both of said levers extending in the general direction of the axis of said shaft.

3. In a friction-clutch, the combination of a shaft, a pulley loosely journaled directly on said shaft but laterally fixed thereon, a flexible plate rigidly fixed to said shaft at one end of the pulley-hub, a controlling device on said shaft at the other end of said pulley-hub, a fixed and a movable friction-ring for clutching said plate, and a pair of link-connected eccentric levers fulcrumed on the pulley-hub near opposite ends thereof, one of said levers being pivoted to said movable ring and the other of said levers being connected to said controlling device.

4. In a friction-clutch, the combination of a shaft, a pulley loosely journaled on said shaft and making direct contact therewith but laterally fixed thereon, a flexible friction-plate fixed to said shaft at one end of the pulley-hub, a fixed and a movable friction-ring for clutching said plate, said fixed ring being carried by the pulley, levers for operating said friction-rings, and a controlling device for operating said levers, said controlling device being located on said shaft at the end of the pulley-hub opposite to said flexible plate.

5. In a friction-clutch, the combination of a shaft, a pulley loosely journaled on said shaft, and making contact therewith but laterally immovable thereon, a flexible plate fixed to said shaft at one end of the pulley-hub, a fixed and a movable friction-ring, two bands secured to and encircling said pulley-hub at opposite ends thereof, two link-connected eccentric levers fulcrumed on said bands for operating the movable friction-ring, and means at the end of the pulley-hub opposite to said plate, for operating said levers.

6. In a friction-clutch, the combination of a shaft, a pulley loosely journaled on said shaft and making direct contact therewith but laterally fixed thereon, a flexible friction-plate fixed to said shaft at one end of the pulley-hub, a movable friction-ring for clutching said plate, a friction-ring fixed to the pulley-hub, a lever pivoted to said movable ring, a fulcrum for said lever fixed relatively to the pulley-hub and located nearer the shaft-axis than to the point of attachment of said lever to said movable ring; a second lever; a link forming the connection between said levers; a fulcrum for said second lever fixed relatively to the pulley-hub and located nearer to the shaft-axis than to the point of connection of said link; and a controlling device for said second lever, said controlling device being located on the shaft at the end of the pulley-hub opposite to said friction-plate.

7. The combination of a shaft, a lateral fixed pulley loosely mounted thereon, a flexible plate fixed on said shaft at one side of said pulley for driving the same, a ring rigidly carried by the pulley-hub, a movable ring coöperating with said fixed ring to clutch said plate, a lever fulcrumed on said fixed ring and pivotally connected to said movable ring, a shifting collar mounted on said shaft at the opposite side of said pulley, and connections between said shifting collar and said lever for operating the same.

8. In a friction-clutch, the combination of a shaft, a pulley loosely journaled thereon and making direct contact with said shaft, but being laterally fixed thereon, a flexible friction-plate fixed to said shaft at one end of the pulley-hub, a controlling device on said shaft at the other end of said pulley-hub, a fixed and a loose friction-ring; a pair of bands fixed to and encircling the pulley-hub on opposite ends thereof, one of said bands carrying said fixed ring, and two link-connected operating-levers fulcrumed on said bands, one of said levers being connected to said movable ring and the other of said levers having connection with the said controlling device.

HUGH MUIR.

Witnesses:
ARTHUR M. COX,
SADIE WOLF.